United States Patent
Weinhold

(10) Patent No.: US 6,672,631 B1
(45) Date of Patent: Jan. 6, 2004

(54) PIPE COUPLING WITH RAPID ACTING CLOSURE

(76) Inventor: Karl Weinhold, Im Jagdfeld 43, D-41464, Neuss (DE)

( * ) Notice: Subject to any disclaimer, the term of this patent is extended or adjusted under 35 U.S.C. 154(b) by 0 days.

(21) Appl. No.: 10/111,043
(22) PCT Filed: Jul. 14, 2000
(86) PCT No.: PCT/EP00/06729
§ 371 (c)(1), (2), (4) Date: Jul. 16, 2002
(87) PCT Pub. No.: WO01/31246
PCT Pub. Date: May 3, 2001

(30) Foreign Application Priority Data

Oct. 20, 1999 (DE) .................... 199 50 619

(51) Int. Cl.⁷ ................ F16L 23/00
(52) U.S. Cl. ............ 285/409; 285/81; 285/367; 285/410; 24/285
(58) Field of Search ........ 285/409, 81, 367, 285/410, 411; 24/285, 271

(56) References Cited

U.S. PATENT DOCUMENTS

| | | | | |
|---|---|---|---|---|
| 2,689,141 A | * | 9/1954 | Kiekhaefer | 285/409 |
| 4,123,095 A | * | 10/1978 | Stehlin | 285/409 |
| 4,527,818 A | * | 7/1985 | Rundell | 285/411 |
| 4,657,284 A | * | 4/1987 | Fiori | 285/410 |
| 5,873,611 A | * | 2/1999 | Munley et al. | 285/367 |
| 6,050,615 A | | 4/2000 | Weinhold | |
| 6,056,332 A | * | 5/2000 | Foster | 285/367 |

FOREIGN PATENT DOCUMENTS

DE    3839604    *   5/1990   ........ 285/367

* cited by examiner

Primary Examiner—David Bochna
(74) Attorney, Agent, or Firm—Proskauer Rose LLP

(57) ABSTRACT

A pipe coupling comprising two clamp halves connected on one end and with a rapid action closure for separably connecting the diametrically opposing other end. The rapid action closure contains a screw bolt, one end of which is coupled to one of the clamp halves and onto the other end of which a screw nut tightens the clamp half into the closed position. A lever lockable in the closed position by a bow-type spring is coupled to the screw nut. The pipe coupling comprises a bow-type spring in each clamp half, wherein the eyelet of the bow-type spring is centrally coupled to the region of the articulated connection between the clamp halves and the free end of the bow-type spring is held in the region of the end of each clamp half which is situated on the rapid action closure such that it can be longitudinally displaced.

8 Claims, 2 Drawing Sheets

PIPE COUPLING WITH RAPID ACTING CLOSURE

BACKGROUND OF THE INVENTION

The present invention relates to a pipe coupling with two clamp halves of essentially C-shaped cross section that are connected on one end such that they are pivotable relative to one another about a bolt, and with a rapid acting closure for separably connecting the diametrically opposing other ends of the clamp halves, wherein the rapid action closure comprises a screw bolt, one end of which is coupled to one of the clamp halves and onto the other end of which a screw nut is screwed which tightens the clamp halves into the closed position, and wherein a lever that can be locked in the closed position by means of a bow-type spring is coupled to the screw nut. The present invention also relates to pipe flanges for use in connection with such a pipe coupling.

Pipe couplings that are provided with a rapid acting closure are known in numerous variations. In most of these pipe connections, the coupling flanges of the pipes need to be formed differently in order to achieve a corresponding guidance for axially clamping together the flange ends by means of a clamp. In this case, the guidance is usually realized in the form of a male and a female component.

A pipe coupling is known from DE 197 22 969 C1. In this case, the two flange ends are butt-jointed, i.e., a restraint for the two flange ends is not provided. If this rapid acting coupling is not installed very carefully, it is possible that the two flanges are shifted relative to one another. This may cause the ring seal to become damaged or even destroyed such that the function of this known pipe coupling is impaired.

SUMMARY OF THE INVENTION

Starting from this the object of the present invention is to design and additionally develop a pipe coupling of the initially cited and previously described type in such a way that a reliable installation of the pipe coupling with a flawless seal can always be ensured with a low constructive expenditure.

With respect to the pipe coupling, this object is attained due to the fact that a bow-type spring is arranged on the side of the pipe in each clamp half, wherein the eyelet of said bow-type spring is centrally coupled to the region of the articulated connection between the clamp halves, and wherein the free end of said bow-type spring is held in the region of the end of each clamp half which is situated on the rapid acting closure such that it can be longitudinally displaced.

With respect to the flange ends, the object of the present invention is attained due to the fact that the flange contains a circumferential recess on its end, wherein said recess forms an annular collar for accommodating the bow-type springs together with the identical flange of the other pipe to be connected.

When the pipe coupling is placed over the pipe flanges, the two bow-type springs are accommodated in annular sections of the flanges such that the flange ends are centered relative to one another similar to an auxiliary sleeve. When the pipe coupling is tightened, the two springs are deformed and annularly placed around the pipe flanges to be coupled such that the corresponding distance from one another is fixed. Due to this measure, it is reliably prevented that the two flange ends are able to shift relative to one another. This means that damages to or even the destruction of the ring seal situated between the flange ends is reliably prevented.

According to another embodiment of the invention, the eyelets of the bow-type springs are accommodated by the bolts that connect the clamp halves to one another in an articulated fashion. This means that no additional parts are required for the articulated accommodation of the bow-type springs. The free ends of the two bow-type springs are preferably formed in the shape of a hook, wherein each hook-shaped end encompasses the clamp half in the region of the rapid acting closure. Thus, it is ensured that the bow-type springs participate in the length change that occurs when the pipe coupling is tightened. The shape of the hooks is preferably adapted to the shape of the clamp halves in such a way that the bow-type springs are connected to the respective clamp half on both ends so as to prevent a free movement of the bow-type springs situated in the interior of the clamp halves relative to the clamp halves, namely because such a free movement may be obstructive when tightening the pipe coupling, as well as with respect to keeping the pipe couplings in stock.

According to another characteristic of the invention, both clamp halves have the same shape. This is particularly practical because the pipe coupling according to the invention can be manufactured very inexpensively.

According to another embodiment of the invention, the width of the annular collar formed by the two flanges is slightly wider than the width of the bow-type springs. Due to this measure, it is ensured that the pipe flanges to be coupled are axially pressed together by the generally known—beveling of the clamp. In another embodiment of the invention, the flange ends are provided with a circumferential annular groove for accommodating a ring seal on the inner side of the pipe in order to seal the pipe connection. In this respect, it is practical to respectively provide both flange ends with an annular groove that essentially has a semicircular cross section. Due to the fact that the special design of the pipe coupling with the bow-type springs according to the invention causes both flange ends to be centered relative to one another during the installation of the pipe coupling, it is possible to arrange the ring seal very close to the inner wall of the pipe. This reliably ensures that no product residues at all can remain in the annular gap between the flanges.

BRIEF DESCRIPTION OF THE DRAWINGS

The present invention is described in more detail below with reference to one preferred embodiment that is illustrated in the figures. The figures show.

DETAILED DESCRIPTION OF THE INVENTION

Figure 1:
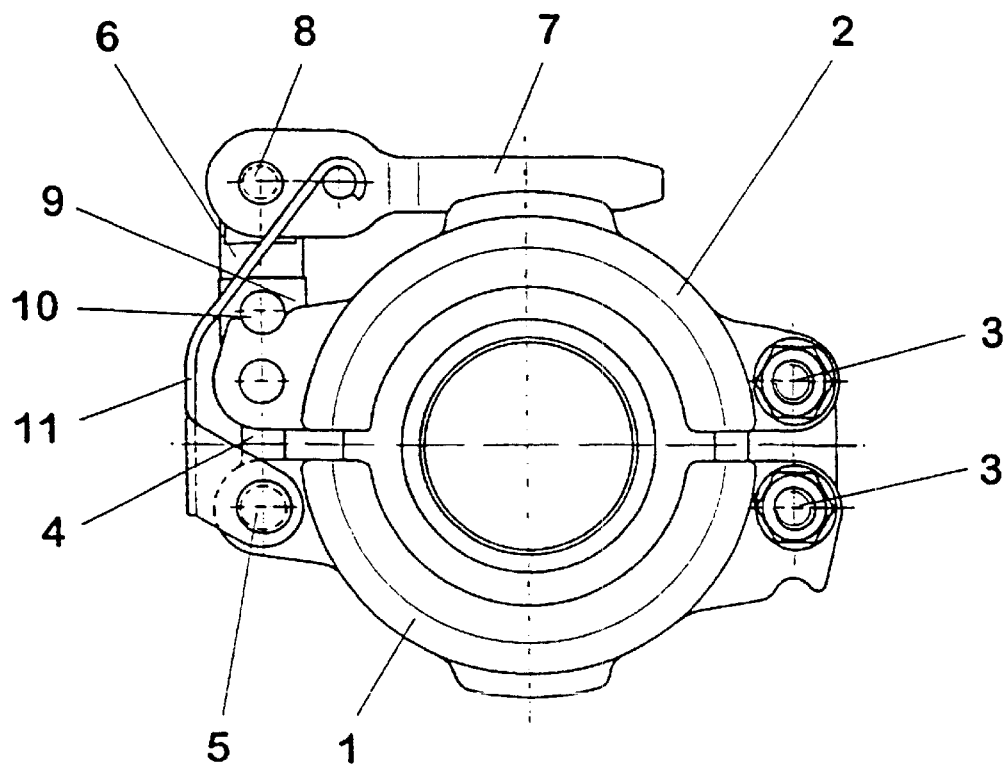
FIG. 1, a side view of a pipe coupling.

FIG. 1 shows a side view of the pipe coupling according to the invention, wherein the clamp halves 1, 2 are connected to one another in an articulated or pivoted fashion by means of two screw bolts 3 on one of their adjacent ends. The bolts 3 may consist of removable screw bolts with a lock-type screw nut screwed thereon as shown in FIG. 1.

A rapid acting closure with a screw bolt 4 is situated on the other diametrically opposing ends of the clamp halves 1, 2 that have an approximately C-shaped cross section. This screw bolt is supported on the other end of the clamp half 2 by a bearing journal 5 such that it can be pivoted about an axis that extends parallel to the pipe coupling. A screw nut 6, to which a lever 7 is coupled by means of a bearing journal 8, is screwed onto the free threaded end of the screw bolt 4. The screw nut 6 cooperates with a sliding element 9 that is pushed over the threaded shaft of the screw bolt 4 and comprises two axial bolts 10 that extend in opposite directions and are arranged in a depression on the other end of the clamp half 2 which is not identified in detail after aligning the clamp halves 1 and 2.

In the preferred embodiment shown, the lever 7 is secured in the closed position by means of a bow-type spring 11 that is coupled to the same bearing journal 5 as the, screw bolt 4.

Figure 2:
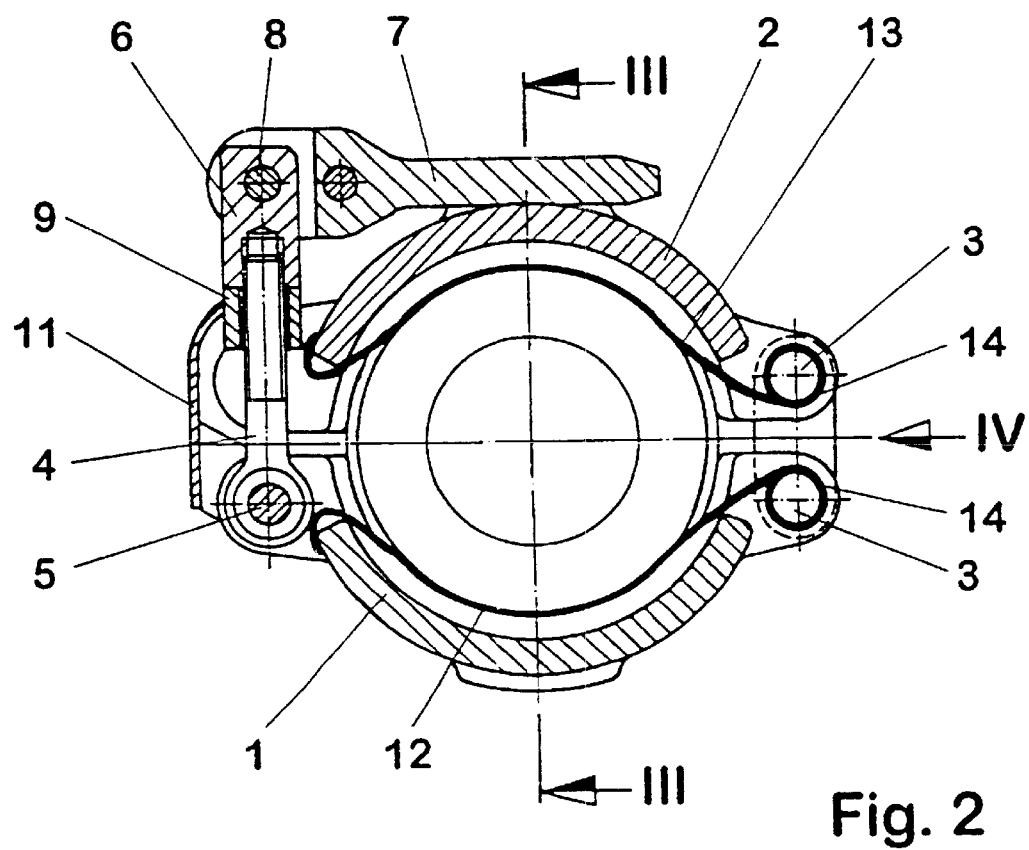
FIG. 2, a cross section through the pipe coupling.

The cross section shown in FIG. 2 makes it possible to ascertain that a bow-type spring 12 and 13 is respectively arranged in the interior of each clamp half 1, 2, namely on the side of the pipe. One end of these bow-type springs is respectively provided with an eyelet 14 that is placed around the bolts 3. The other ends of the bow-type springs 12 and 13 are formed in the shape of hooks and placed around the central webs of the clamp halves 1 and 2 in order to allow a longitudinal displacement for compensating the length change that occurs when tightening the coupling.

Figure 3:
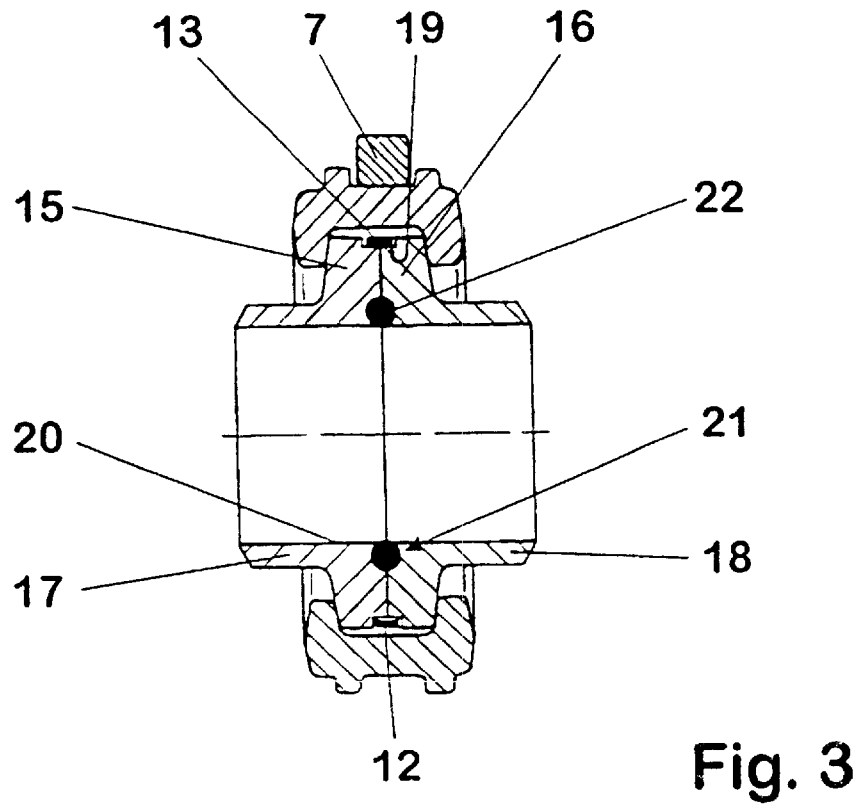
FIG. 3, a section through the pipe coupling along the line III—III in FIG. 2, and FIG. 4, a side view of the pipe coupling viewed in the direction of the arrow IV in FIG. 2.
Figure 4:
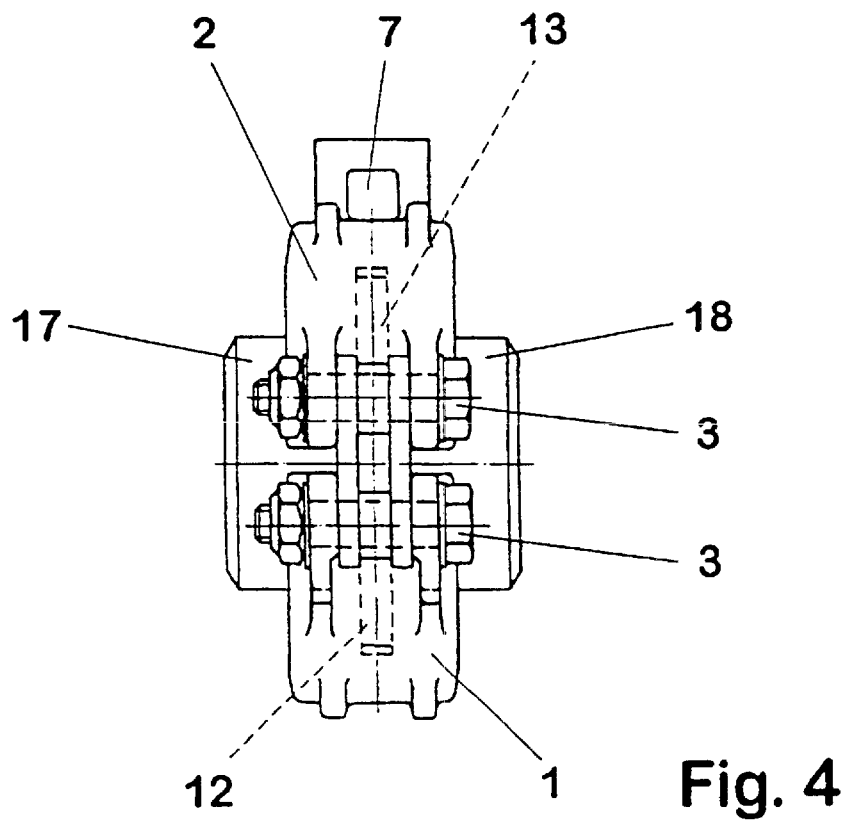

According to the preferred embodiment of the invention which is shown in FIG. 3, the flanges 15, 16 of two pipes 17, 18 to be connected to one another comprise a circumferential recess on their ends such that an annular collar 19 is formed. The width of this collar preferably is slightly wider than the width of the bow-type springs 12, 13. Due to this measure, it is ensured that the desired axial tightening to be achieved with the beveled design of the flanges and correspondingly shaped inner flanks of the clamps is not impaired by the bow-type springs 12, 13. However, the pipe coupling according to the invention is also suitable for connecting pipes with flanges that do not contain an annular collar as long as the width of the bow-type springs is sufficiently large.

FIG. 3 also shows that the flange ends comprise a circumferential annular groove 21 for accommodating a ring seal 22 directly adjacent to the inner side 20 of the pipe. It is preferred to utilize an O-ring with circular cross section as the ring seal 22. In this case, the annular grooves 21 essentially have a semicircular cross section. In this embodiment, it is ensured that no product residues at all can remain in the annular gap between the flanges 15 and 16.

The pipe coupling according to the invention is also shown in the form of a side view in the direction of the arrow IV in FIG. 2, wherein the—hidden—bow-type springs 12 and 13 are illustrated with broken lines.

The pipe coupling is closed as described below:

The pipe coupling is placed around the flanges 15, 16 while the rapid acting closure is open and the clamp halves 1, 2 are pivoted apart from one another. The clamp halves 1, 2 are pivoted into the aligned position about the bolts 3. Subsequently, the screw bolt 4 is pivoted into the vertical position shown in the figures. A centering of the pipe flanges 15, 16 is already achieved when the clamp halves 1, 2 are aligned, namely due to the bow-type springs 12, 13 arranged in the interior of the pipe clamp halves 1, 2. This means that the seal 22 situated in the gap between the pipes cannot become damaged. The sliding element 9 is then pushed over the screw bolt 4 from its free end until the axial bolts 10 are situated in the depressions of the clamp half 2 which are not identified in detail. The screw nut 6 is subsequently screwed on the screw bolt 4 by means of the lever 7 coupled thereto until it comes in contact with the sliding element 9. When the lever 7 is additionally turned, the axial bolts 10 of the sliding element 9 exert pressure upon the other end of the clamp half 2 such that the clamp halves 1, 2 that oppose one another on this side are mutually tightened.

The required axial pressure for reliably tightening the two flanges 15 and 16 relative to one another is achieved with the beveling of the flanges 15, 16 and the correspondingly shaped inner sides of the clamp halves. After the closed position is reached, the lever 7 is placed into the depression of the clamp half 2 which is not identified in detail and the engagement of the bow-type spring 11 against turning or pivoting is secured. A supplementary splint may be used for fixing the lever 7 on the clamp half 2 in addition to the bow-type spring 11.

The figures clearly indicate that both clamp halves 1, 2 may have the same shape. Consequently, the pipe coupling according to the invention can be manufactured very inexpensively.

What is claimed is:

1. A pipe coupling comprising:
   two clamp halves of essentially C-shaped cross section connected on one end to form an articulated connection such that they are pivotable relative to one another about a bolt, said two clamp halves comprising eyelets and a rapid acting closure for separably connecting the diametrically opposing other ends of the clamp halves, the rapid acting closures comprising a screw bolt, one end of which is coupled to one of the clamp halves and onto the other end of which a screw nut is screwed which tightens the clamp halves into closed position, and a lever lockable in the closed position by means of a first bow-type spring is coupled to the screw nut;
   wherein second bow-type springs are arranged on the side of the pipe in each clamp half eyelets of second bow-type spring being centrally coupled to the articulately connected region of the articulated connection between the clamp halves and the free ends of said second bow-type springs being held in the region of the end of each clamp which is situated on the rapid acting closure such that it can be longitudinally displaced.

2. A pipe coupling according to claim 1, wherein the eyelets of the second bow-type springs are accommodated by the bolts that connect the clamp halves to one another in an articulated fashion.

3. A pipe coupling according to claim 1, wherein the free ends of the second bow-type springs are formed in the shape of hooks and encompass the clamp halves in the region of the rapid-acting closure.

4. A pipe coupling according to claim 1, wherein both clamp halves have the same shape.

5. A pipe flange for use in connection with a pipe coupling according to claim 1, wherein a first flange of a first pipe contains a circumferential recess on its end, wherein said recess forms an annular collar for accommodating the second bow-type springs together with an identical second flange of a second pipe to be connected.

6. A pipe flange according to claim 5, wherein said annular collar formed by the first and second flanges has a width slightly wider than the width of the,second bow-type springs.

7. A pipe flange according to claim 5, wherein the flanges comprise an inner side, an outer side, and flange ends, wherein the flange ends comprise a circumferential annular groove situated directly adjacent to the inner side of said pipe accommodating a ring seal.

8. A pipe flange according to claim 7, wherein each flange end contains an annular groove of essentially semicircular cross section.

* * * * *